Oct. 1, 1957     J. T. RAISIN     2,808,192
FOOD CONTAINER
Filed Aug. 11, 1953
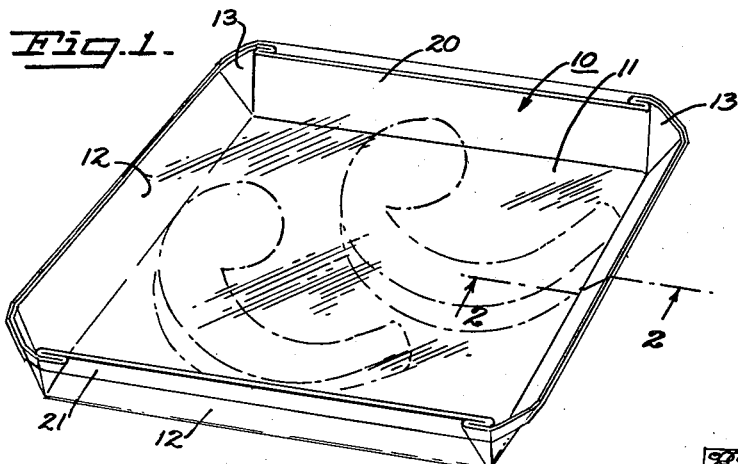
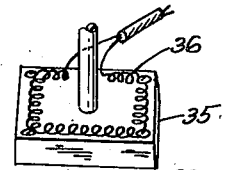
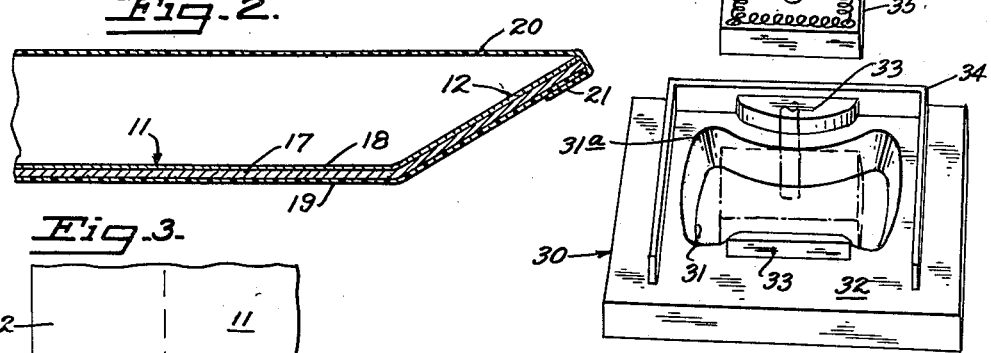
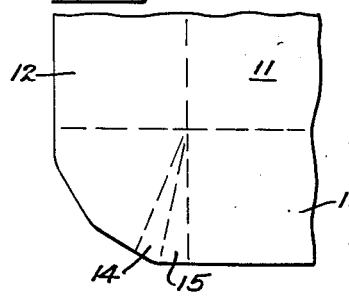
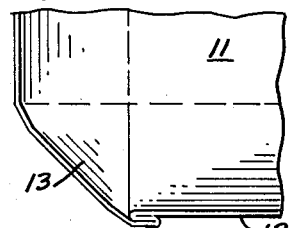
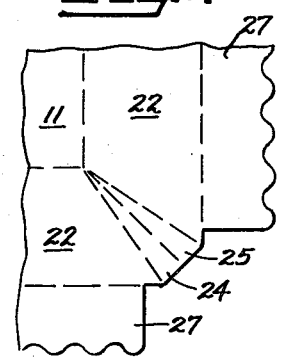
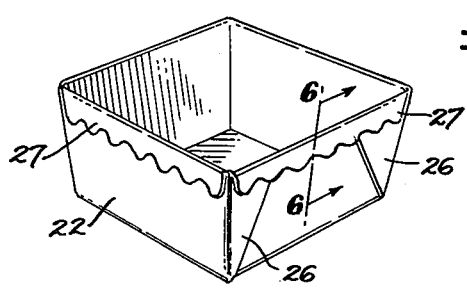
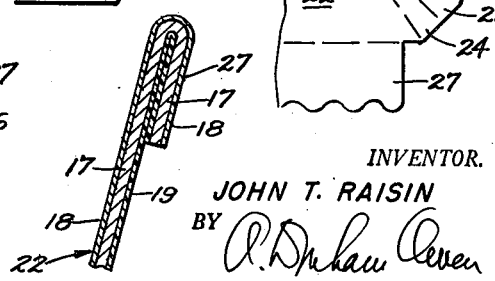
INVENTOR.
JOHN T. RAISIN
BY
ATTORNEY

United States Patent Office 2,808,192
Patented Oct. 1, 1957

2,808,192

FOOD CONTAINER

John T. Raisin, San Mateo, Calif., assignor to John T. Raisin Corporation, San Francisco, Calif., a corporation of California Application August 11, 1953, Serial No. 373,524

9 Claims. (Cl. 229—31)

This invention relates to open containers of the type used in merchandising food items in grocery stores, chain markets, and the like where a transparent protective film is sealed about the food in the container, and in particular to basket and shallow tray constructions that are resistant to food stains and moisture loss.

At present, the usual food container is constructed of cardboard or very thin wood and is used for a wide variety of foods such as meats, fruit, berries, prepared dishes and the like. Such materials soon deteriorate in the presence of moisture, food acids, grease, and other materials normally occurring in foods. Also many valuable juices are lost by absorption into the fibrous material of the container causing the food to dry out and lose flavor. The difficulties encountered in handling these wet, sodden containers is a matter of common experience. For example, liquids in the food will leak through the containers often staining the purchaser's clothes, car seats, rugs, and so on. If the container continues to drip after it is placed in the refrigerator, the food must be transferred to an additional container to prevent contamination of other foods.

Another problem arising from the use of cardboard or wooden food containers is the difficulty in providing a folded, glued, or stapled corner that won't leak or deteriorate. Heretofore, the corners have generally been die-cut and then folded and glued; or the corner has otherwise required the careful application of glue during fabrication. Such corners have not successfully prevented leakage, since the glue itself is often attacked by the chemicals in the food.

Another problem arises because moisture will condense on the outside of the box. For example, condensation may occur during refrigeration as in the chilled market display bins generally used for such items as meat, poultry, and the like.

Still another problem arises because many food containers, such as berry baskets, are used in the field during picking, and are often subjected to the hot sun, rain, or other detrimental weather conditions. Heat absorbed by the baskets is also a substantial factor in premature spoilage of the produce before it can be refrigerated.

Waxed containers have been tried but have not proved successful since many food liquids, such as meat blood, penetrate the wax and deteriorate or stain the container. Also the wax will crack as the blank is folded into a container forming crevices through which the juices and moisture may pass.

A further practice has been to overwrap the entire package with a thin transparent film, such as cellophane or pliofilm, sealing the film against itself on the underside of the package. Such a bottom seal has been necessary to permit a clear uncluttered view of the food product wrapped in the package. This procedure requires a relatively large sheet of film which must be very carefully folded and sealed in order to prevent leakage. More often than not juices or other moisture will collect in the bottom folds and eventually leak out; or the juices will drip onto the clothes or kitchen floor when the package is opened. Also, the film in no way improves the properties of the inner fibrous container which continues to soak up the valuable juices and soon becomes stained and soggy as before.

The present invention solves these problems in what seems now to be a relatively simple way by providing thin layers of resistant material on either side of a relatively stiff fibrous backing, the object being to provide a food container that is impervious to moisture, resistant to food stains, and that may be easily sealed and rendered completely moisture proof by a thin sheet of protective film just large enough to overlap the edges of the container.

Another object of the present invention is to provide a food container with an outer heat responsive coating that will permit an overlying film of protective material to be heat sealed, directly to the container itself, without requiring additional sealing folds of the material on the underside of the container.

Another object is to provide such a food container that has heat sealed web-type corners providing a leak proof moisture proof structure, fabricated without the use of glues, adhesive, or mechanical fastening means.

Another object is to provide a metallic foil liner for a food container that will resist moisture losses by causing the moisture to condense on its surface rather than be absorbed by the container walls.

Still another object is to provide a container with an interior lining that will reflect heat and thereby maintain a relatively cool surface when the container is subjected to the direct rays of the sun or other radiated heat.

Other objects and advantages of the present invention will be apparent from the following description and from the drawings in which:

Fig. 1 is a perspective view of a tray constructed according to the present invention, showing a food product in the tray and a transparent protective film over the tray;

Fig. 2 is an enlarged view in vertical section along the line 2—2 of Fig. 1;

Fig. 3 is a plan view of one corner of the tray of Fig. 1 before folding;

Fig. 4 is a view similar to Fig. 3 after the corner has been folded and sealed;

Fig. 5 is a perspective view of a basket constructed according to the present invention, showing a modified corner and upper edge construction;

Fig. 6 is an enlarged view in vertical section along the line 6—6 of Fig. 5;

Fig. 7 is a plan view of one corner of the box of Fig. 5, before folding; and

Fig. 8 is a perspective view of a folding device that may be used in manufacturing the trays of the present invention.

Referring to the drawings, the tray 10 is illustrative of a general shape that is often termed a "meat tray" in the food merchandising field. Such trays have varying dimensions, some being square, others oblong, but all have the common features of a substantially flat bottom 11 and upwardly folded edges 12 to retain the moisture and juices of the food products placed therein. In the tray 10 the edges are held at an angle to the bottom by folded corners 13, known as "web-type" corners.

This corner is constructed, as shown in Figs. 3 and 4, by folding portions 14 and 15 of the box blank into a V 16 which, heretofore, has been sealed to an edge 12 by means of adhesive, glue, or metal clips.

As best shown in Fig. 2, the container of the present invention is constructed from a blank comprising three layers of material bonded together to form an integral unit. The base or backing layer 17 is made of relatively stiff cardboard or any other suitable material to which is bonded a thin inner liner of metallic foil 18, preferably aluminum foil. However, other foils such as tin foil or zinc foil may be used. Bonded to the outer side of the cardboard 17 is a heat responsive or thermoplastic coating 19, preferably a polymer resin, such as a vinyl, acrylate, or styrene resin.

The trays 10 are manufactured by first laminating a thin layer of aluminum foil 18 to sheets or rolls of a fibrous backing material 17 such as cardboard. Next, the reverse side of the laminated material is coating with a layer of thermoplastic material at an elevated temperature and allowed to cool, in a well known manner. Blanks of the desired shape are cut from the resulting sheets or rolls, and folding indentations impressed on them. This operation is preferably performed by a die cutting press; but manual operation may be used.

The web corners are then formed by heat sealing the adjacent thermoplastic layers 19 of the V fold 16 and the edge 12 to form sturdy moisture proof corners 13. The corner folding and sealing operations may be carried out on a production basis by high speed machinery for that purpose or may be performed by hand with an iron, if desired. However, a preferred method for simultaneously folding and sealing the web-type corners 13 may be practiced on a simple folding device, such as the one illustrated in Fig. 8.

The folding device of Fig. 8 comprises a folding die 30 having a carefully shaped central opening 31. As shown, the sides 31a of the opening 31 taper inwardly from top to bottom. Secured to the top face 32 of the die 30 are shaped folding guides 33 and a three-sided blank positioner 34. Adapted to cooperate with die 30 is a punch member 35 which is mounted for vertical movement with respect to the central opening 31. The punch 35 may be actuated automatically or manually, as by a foot pedal, in a well known manner. A heating element is attached to the punch 35 for a purpose to be later described. Any convenient source of heat may be used, such as an electrical heating element 36 or a heat cartridge clamped to the punch.

In operation, the die-cut blanks are positioned on the member 34 and the punch 35 actuated. As the punch descends, the shaped guides 33 and the sides 31a of the opening 31 cooperate to fold the corners of the blank into the tray form of Fig. 1.

As this folding operation is taking place, the adjacent thermoplastic layers 19 of the V fold 16 and tray edge 12 are simultaneously heat sealed to one another by means of heat conducted from the punch 35 to the corners 13 by the conductive layer of aluminum foil 18. In this way, the coated bottom of the tray may be exposed to air currents through the opening 31 as the corners are heat sealed. The entire heat sealing operation may take less than a second, and the movement of the punch may be allowed to push the completed sealed tray 10 through the opening 31 onto a conveyor belt or other means below.

It is clear that the transfer of heat from the center of the tray to the corners greatly facilitates the heat sealing operation without interfering with the corner folding operation, since folding room is permitted between the punch 35 and die walls 31a. Heat readily flows through the conductive metal foil 18 into the interior of the V fold 16 so that heat is supplied to both sides of the adjacent layers 19 of thermoplastic material, insuring an excellent bond. Without the metal foil it would be necessary to apply heat to an area directly opposite the corner fold, which would either cause interference with the folding operation or require an undesirable external application of heat directly to the thermoplastic coating 19.

The resulting tray construction provides a virtually leak proof, grease proof, food container having the necessary strength to hold its shape over long periods of use. The base layer 17 is protected from moisture and food chemicals by layers of resistant material on both sides; on the inner side by the aluminum foil liner 18; on the outer side by the thermoplastic coating 19.

The inner metallic foil liner is highly resistant to moisture penetration and food stains, and, if desired, its metallic surface may be washed and used over again. In addition, the smooth metallic surface is conducive both to condensation of moisture on the container walls and to heat reflection. The former prevents moisture within the container from being absorbed by the base layer 17 and lost to the purchaser, while the property of heat reflection is particularly useful where the containers are to be used in the open sun, as will be later explained. A further advantage arises from the inherent conductivity of the metal foil lining, just described. This feature permits the adjacent thermoplastic layers forming the web corners 13 to be heat sealed without direct heating contact with the thermoplastic material itself.

In addition to providing an outer protective coating against external moisture, and a convenient means to heat seal the web corners 13, the outer thermoplastic coating 19 also provides an equally convenient sealing medium to which a protective film of cellophane or pliofilm may be easily heat sealed. Because of this fact, a considerably smaller sheet size of film may be used since the film need not be folded under the container and sealed against itself, but may be sealed directly to the thermoplastic coating. As indicated in Figs. 1 and 2, a narrow strip 21 of a very small sheet of film 20 may be overlapped against the outer coating 19 and bonded to the container. Again the heat required to perform the sealing operation is preferably supplied by a special machine devised for large scale production purposes, but a hand iron may, of course, be used.

The seal between the container 10 and the film 20 is not only easier to effect but is much less apt to develop leaks, since the sealing action does not depend on folds of film. Instead, a continuous bond is provided around the entire periphery of the container, and at a substantial reduction in material costs due to the much smaller sheet of film required.

It will be observed that the required sheet size of protective film 20, to seal the thermoplastic coated containers of the present invention, is about ¼ of the sheet size needed to seal previously known containers. Assuming that square sheets of film are used, the side of the film sheet must be at least twice that of the film sheet utilized in the present invention if the edges of the film sheet are to be sealed against themselves on the underside of the food container. This is true regardless of the shape or size container used; and if containers having sides of substantial width are used, the difference in film size will be even greater. Savings in film costs, of course, will bear a direct relation to this reduction in sheet size.

Referring to Figs. 5 to 7, a modified container in the shape of a basket is illustrated. The basket form is particularly adapted to packaging such items as berries or fruit.

The construction of the basket is similar to that shown in Figs. 1 to 4, except that there are only two corner portions 24 and 25 to form the folding V 26, and additional edge flaps 27 are added to the box side sections 22. This construction provides for the more pronounced corner necessary in the basket design and adds additional strength to the upper rim portions of the basket.

As shown in Fig. 6, the edge flaps 27 are bent back and heat sealed to the box sides 22 by the adjacent layers 19 of thermoplastic coating in the manner previously described. To apply the film 20 to the basket construction of Fig. 5, the film must extend somewhat below the edge flaps 27 until it contacts the plastic coating 19 below.

As was previously noted, the smooth metallic foil lining 18 provides a heat reflecting surface which is particularly useful when the containers are used in the open sun as when the basket form is used by berry pickers. By reflecting the radiated heat of the sun's rays, a relatively cool surface is maintained, and little heat is absorbed by the backing which might materially contribute to premature spoiling or over-ripening of the berries before they are refrigerated.

To those skilled in the art to which this invention relates, many additional changes in construction and widely differing embodiments and applications of the invention will suggest themselves without departing from the spirit and scope of the invention. The disclosures and the description herein are purely illustrative and are not intended to be in any sense limiting. For example, trays of many varied shapes in addition to those illustrated, such as oval trays or trays having more than four sides, are clearly within the broad invention disclosed.

By the above described construction, a unique food container is provided that is not only appealing to the eye but which also functions to retain valuable juices within an inner metallic liner that is highly resistant to deterioration and food stains.

In addition, an outer thermoplastic coating is provided that has the dual functions of an adhesive and an outer protective coating. As an adhesive, the outer coating permits a novel heat sealed corner that may be folded and sealed in one simple operation, and also allows the use of an unusually small overwrap film which may be tightly sealed to the container itself.

What I claim is:

1. A leak-proof food container comprising a polygonal box folded to shape from a unitary three-ply blank and having an inner ply of thin metallic foil, a middle ply of cardboard backing, and a thin outer ply of thermoplastic resin, said thermoplastic resin ply serving to retain said blank in its box shape by being fused to itself at heat-sealed web-type corners.

2. The container of claim 1 wherein the sides provided by said polygonal box terminate in an upper edge that is reinforced by a marginal portion thereof folded over, opposite faces of said outer ply being face to face and heat sealed together.

3. A leak-proof food container comprising a polygonal box folded to shape from a single blank having three bonded-together plies, an upper ply of thin aluminum foil, a middle ply of cardboard backing, and a thin lower ply of thermoplastic polymeric resin that retains said blank in the shape of an open top box by means of heat-sealed web-type corners while serving as the outer ply of said box, said upper ply serving as the inner ply and also serving to conduct heat over said blank during the folding and heat-sealing of said corners.

4. A leak-proof container for food and the like, comprising a polygonal box folded to shape from a unitary multiply blank and having an inner ply of thin metallic foil, an adjoining ply of cardboard backing, and a thin outer ply of thermoplastic resin, said thermoplastic resin ply serving to retain said blank in its box shape by being fused to itself at heat-sealed web-type corners.

5. A leak-proof food container comprising a polygonal open-top box for containing food and having a bottom and sides formed from a single folded blank of bonded three-ply material having an inner ply of thin metallic foil, a middle ply of cardboard backing, and a thin outer ply of thermoplastic resin, said thermoplastic resin serving to retain said blank in box shape by means of heat-sealed corners, a thin transparent covering sheet for closing the open top of said box, adapted to be heat-sealed to said outer ply adjacent the edges thereof.

6. A leak-proof container especially adapted for containing food, comprising a polygonal open-top box for containing food, folded to shape from a single blank of bonded three-ply material having an upper ply of thin metallic foil, a middle ply of cardboard backing, and a thin lower ply of thermoplastic resin that retains said blank in shape by means of heat-sealed web-type corners while serving as the outer ply of said box, its edges then lying along the upper edges of the box, said upper blank ply serving as the box inner ply, and a transparent covering sheet adapted to have its edges heat-sealed to said outer ply adjacent said upper edges over the open top of said box.

7. A method for forming heat sealed web-type corners in a laminated food container of a type having a layer of metal foil on one side and a thermoplastic coating on the other comprising the step of contacting a central portion only of the metal foil with a heat source as the corners, free from contact by said source, are being folded so that heat is conducted by the metal foil to adjacent layers of thermoplastic material at said corners remote from and free from contact with the heat source.

8. A method of making a food container with web-type corners, comprising the steps of preparing a three-ply sheet having a cardboard ply bonded to and between an upper ply of thin metal foil and a thin lower ply of thermoplastic resin; cutting a generally polygonal blank from said sheet; and shaping said blank into a tray-like member by folding corners of said blank together so as to define a bottom area and sides while simultaneously applying heat to said metal foil at said bottom area only, the heat being conducted by said foil to said corners to fuse said thermoplastic resin there.

9. A method of making a food container with web-type corners, from a three-ply blank having a cardboard ply sandwiched between and bonded to an upper ply of thin metal foil and a thin lower ply of thermoplastic material, comprising, pushing the center portion which is to form the bottom of said container from the metal foil side while impeding and partially confining marginal areas that are to form the sides, so as to fold corners of said marginal areas, while simultaneously applying heat to said metal foil center portion and exposing the lower ply of said center portion for heat dissipation, heat being conducted by the metal foil to said impeded and confined corners to seal them together without direct contact with said heat source and therefore without interfering with their free folding action.

References Cited in the file of this patent

UNITED STATES PATENTS

| | | |
|---|---|---|
| 1,704,175 | Coale | Mar. 5, 1929 |
| 2,106,663 | Schlegel | Jan. 25, 1938 |
| 2,120,902 | Moore | June 14, 1938 |
| 2,131,438 | Jensen | Sept. 27, 1938 |
| 2,260,230 | Olson | Oct. 21, 1941 |
| 2,378,324 | Ray et al. | June 12, 1945 |
| 2,442,936 | Rohdin | June 8, 1948 |
| 2,470,465 | Broeren et al. | May 17, 1949 |
| 2,571,340 | Carson | Oct. 16, 1951 |
| 2,621,129 | Ramsbottom et al. | Dec. 9, 1952 |
| 2,674,536 | Fisher | Apr. 6, 1954 |
| 2,691,259 | Weckesser | Oct. 12, 1954 |